(12) United States Patent
Mori et al.

(10) Patent No.: US 12,548,222 B2
(45) Date of Patent: Feb. 10, 2026

(54) X-RAY CT APPARATUS AND CT IMAGE RECONSTRUCTION METHOD

(71) Applicant: FUJIFILM Healthcare Corporation, Chiba (JP)

(72) Inventors: Yoshiki Mori, Chiba (JP); Yuta Ogura, Chiba (JP); Ryota Kohara, Chiba (JP); Yusuke Tetsumura, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

(21) Appl. No.: 18/489,866

(22) Filed: Oct. 19, 2023

(65) Prior Publication Data

US 2024/0144555 A1    May 2, 2024

(30) Foreign Application Priority Data

Oct. 31, 2022  (JP) .................................. 2022-174620

(51) Int. Cl.
*G06T 11/00*    (2006.01)
*A61B 6/03*    (2006.01)

(52) U.S. Cl.
CPC ............ *G06T 11/005* (2013.01); *A61B 6/032* (2013.01); *G06T 11/006* (2013.01)

(58) Field of Classification Search
None
See application file for complete search history.

(56) References Cited

U.S. PATENT DOCUMENTS

| 10,135,989 | B1 | 11/2018 | Indyk et al. | |
| 2016/0163042 | A1* | 6/2016 | Wollenweber | G01T 1/2985 |
| | | | | 382/131 |
| 2018/0018757 | A1* | 1/2018 | Suzuki | G06N 3/045 |

* cited by examiner

*Primary Examiner* — Darryl V Dottin
(74) *Attorney, Agent, or Firm* — JCIPRNET

(57) ABSTRACT

To reduce an unnatural distortion of an image that occurs in a case in which a high absorption body of X-rays is included in movement correction image reconstruction processing of a CT image.
High absorption body presence or absence determination processing of determining whether or not a high absorption body of X-rays is included is added to movement correction image reconstruction processing, and processing of limiting pixel values of an image pair used for movement correction or processing of selecting an image pair used for calculating a movement vector is performed based on a result of the determination. An X-ray CT apparatus includes a high absorption body determination unit or a pixel value adjustment unit to perform these pieces of processing.

15 Claims, 11 Drawing Sheets

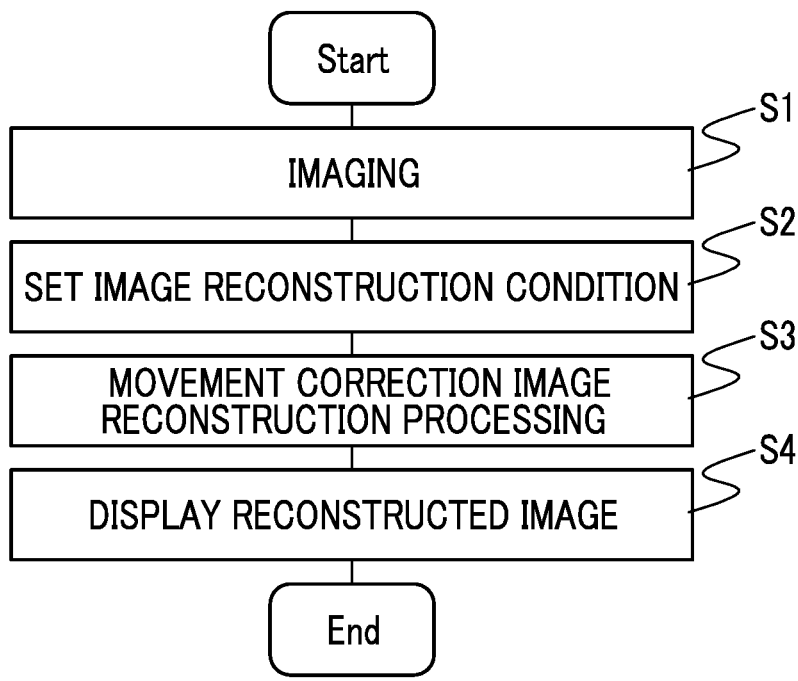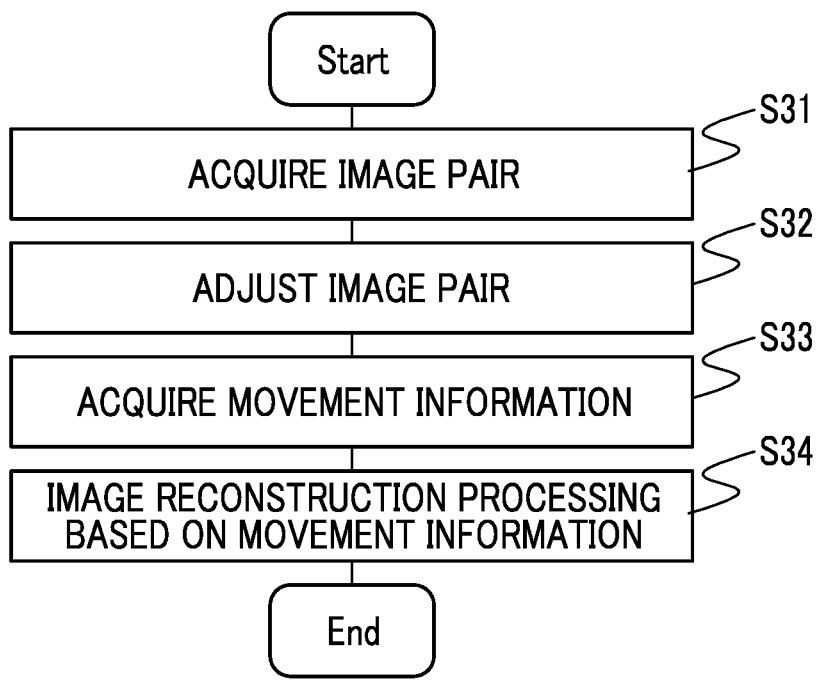

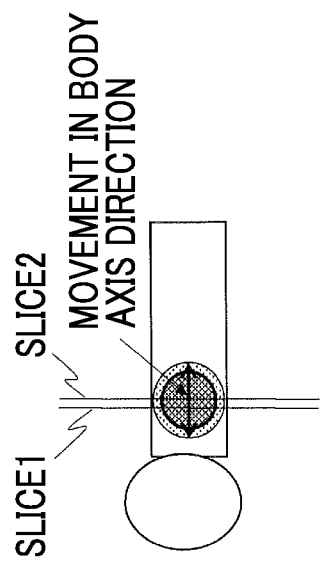
FIG. 13A
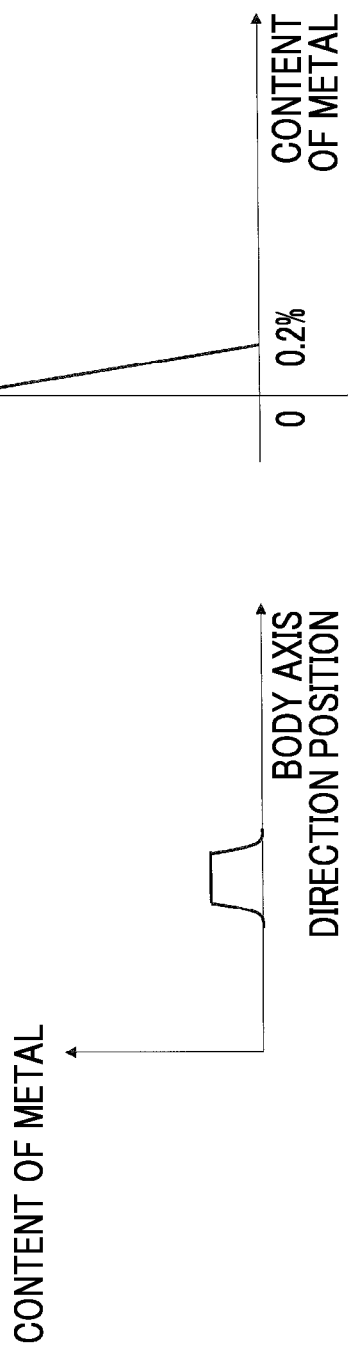
FIG. 13B
FIG. 13C

X-RAY CT APPARATUS AND CT IMAGE RECONSTRUCTION METHOD

INCORPORATION BY REFERENCE

The present application claims priority from Japanese patent application JP 2022-174620 filed on Oct. 31, 2022, the content of which is hereby incorporated by reference into this application.

BACKGROUND OF THE INVENTION

1. Field of the Invention

The present invention relates to an X-ray CT apparatus that obtains a medical image (CT image) by irradiating a subject with X-rays, and relates to a movement correction image reconstruction processing technique for improving image interpretation accuracy or image interpretation efficiency for a moving subject.

2. Description of the Related Art

In a CT examination for a moving subject, such as the heart, a motion artifact may occur in the image due to the movement of the subject during CT scanning. This motion artifact deteriorates a quality of the image, and as a result, there is a possibility that the diagnosis accuracy or the diagnosis efficiency of a disease by a user including a doctor is lowered. In order to solve this problem, processing of correcting and reconstructing the movement in the reconstruction of the CT image (referred to as movement correction image reconstruction processing) is performed in the X-ray CT apparatus (U.S. Ser. No. 10/135,989A and the like).

The CT image is reconstructed by using a plurality of images (projection images) obtained at a plurality of angle positions with a targeted image reconstruction position as a center. In the movement correction image reconstruction processing, the reconstruction is performed by estimating the movement of the subject from a first image and a second image reconstructed at positions facing each other in time with the targeted image reconstruction position as the center, and correcting the movement occurring in a reconstructed image.

In order to correctly estimate the movement of the subject, it is important to accurately extract the movement of the subject from the first image and the second image including noise, and U.S. Ser. No. 10/135,989A discloses a method of extracting only the movement by performing noise reduction processing with respect to the first image and the second image.

SUMMARY OF THE INVENTION

However, in a case in which the subject includes a substance (hereinafter, referred to as a high absorption substance or a high absorption body) that with high X-ray absorption and a high CT value, such as metal or a contrast agent, even in a case in which the noise is reduced by the method of U.S. Ser. No. 10/135,989A, the presence of these high absorption bodies may cause excessive movement correction, and a distortion may occur in the image of the reconstructed image.

For example, in a case in which a pixel having large positive and negative absolute values is generated due to the presence of the high absorption body and the registration of two images is performed by non-rigid body deformation, due to the influence of the deformation of these portions in which the absolute value is large, a peripheral portion may also be deformed, and the distortion in the image may occur. In the method in the related art, the deformation due to the influence of the high absorption body is acquired as movement information and the correction is performed, so that unnecessary correction is performed.

The present invention is to accurately suppress a motion artifact by performing appropriate movement correction with reduced noise while preventing excessive correction due to a high absorption body.

Therefore, in the present invention, it is determined whether or not a high absorption body is included, for a first image and a second image used for movement correction, and processing of adjusting pixel values of the images or selecting an image pair used for acquiring movement information is performed according to a result of the determination.

That is, an aspect of the present invention relates to an X-ray CT apparatus comprising: an imaging unit that includes an X-ray source and an X-ray detector that are rotated around a subject, and acquires transmitted X-ray data of the subject for a predetermined angle range; and a computing unit that generates a reconstructed image by using the transmitted X-ray data acquired by the imaging unit. The computing unit comprises an image pair generation unit that generates an image pair at facing positions by using a part of the transmitted X-ray data, an image pair adjustment unit that adjusts the image pair generated by the image pair generation unit, a movement information acquisition unit that acquires movement information of the subject during scanning by using the image pair adjusted by the image pair adjustment unit, a movement correction image reconstruction unit that performs image reconstruction by correcting the transmitted X-ray data by using the movement information acquired by the movement information acquisition unit, and a determination unit that determines whether or not a high absorption substance of X-rays is included in the subject. The image pair adjustment unit adjusts the image pair used by the movement information acquisition unit based on a result of the determination by the determination unit.

The adjustment of the image pair includes the limitation of the pixel values of the image pair based on the result of the determination, the selection of the image pair based on the result of the determination, and the like.

Another aspect of the present invention relates to a CT image reconstruction method of calculating a movement vector of a subject by using an image pair extracted from transmitted X-ray data acquired by using an X-ray CT apparatus and generated from the transmitted X-ray data at two facing angle positions, and performing image reconstruction in which movement of the subject is corrected by using the movement vector and the transmitted X-ray data.

An aspect of the CT image reconstruction method according to the aspect of the present invention relates to a CT image reconstruction method including: a step of determining whether or not a high absorption substance of X-rays is included in the image pair; and a step of adjusting pixel values of the image pair in a case in which it is determined that the high absorption substance is included in the image pair, in which the movement vector is calculated by using the image pair whose pixel values are adjusted.

Another aspect of the CT image reconstruction method according to the aspect of the present invention relates to a CT image reconstruction method including: a step of determining whether or not a high absorption substance of X-rays is included in the image pair, for an entire image reconstruction range, in which the movement vector is calculated for an imaging position at which it is determined that the high absorption substance is included in the image pair in the entire image reconstruction range by using an image pair at imaging positions at which it is determined that the high absorption substance is not included in the image pair.

It is possible to reduce the excessive correction due to the high absorption substance while suppressing a loss of the movement information to the minimum extent with respect to the first image and the second image, and it is possible to maximize an effect of the correction. In addition, by determining the presence or absence of the high absorption substance and switching a function, the effect is exhibited only under a condition in which the excessive correction due to the high absorption substance is a concern. As a result, it is possible to improve the diagnosis accuracy or the diagnosis efficiency of a disease by a user.

Further, for the image pair, a range that can be taken by the pixel is determined, and the image in which a pixel value more than the upper limit value is substituted with the upper limit value and a pixel value less than a lower limit value is substituted with the lower limit value is generated and used for the movement correction, so that it is possible to prevent the excessive movement correction for the image including the high absorption substance in a state in which necessary movement correction is activated.

BRIEF DESCRIPTION OF THE DRAWINGS

FIG. 3 is a flowchart showing an operation of the X-ray CT apparatus including movement correction image reconstruction.

FIG. 4 is a flowchart showing processing of the movement correction image reconstruction.

FIGS. 13A to 13C are diagrams showing processing of Embodiment 5.

DESCRIPTION OF THE PREFERRED EMBODIMENTS

Embodiments of the present invention will be described below with reference to the drawings.

First, an overall configuration of an X-ray CT apparatus to which the present invention is applied will be described.

Figure 1:
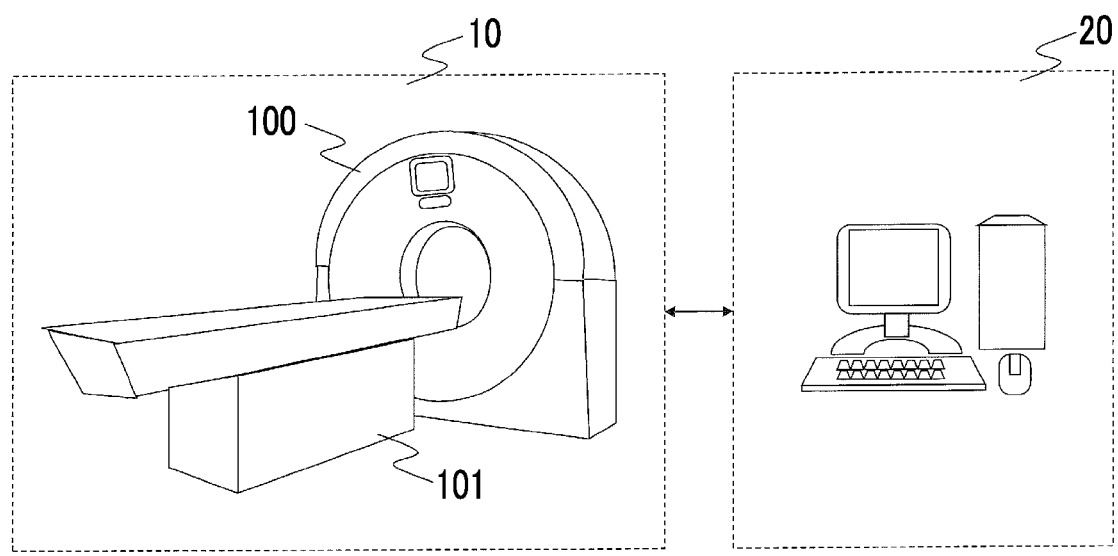
FIG. 1 is a diagram showing an external appearance of an X-ray CT apparatus to which the present invention is applied.

As shown in FIG. 1, an X-ray CT apparatus 1 comprises an imaging unit 10 comprising a gantry 100 and a bed device 101 for capturing a tomographic image and a fluoroscopic image of a subject, and an operation unit 20 that operates and controls the imaging unit 10.

Figure 2:
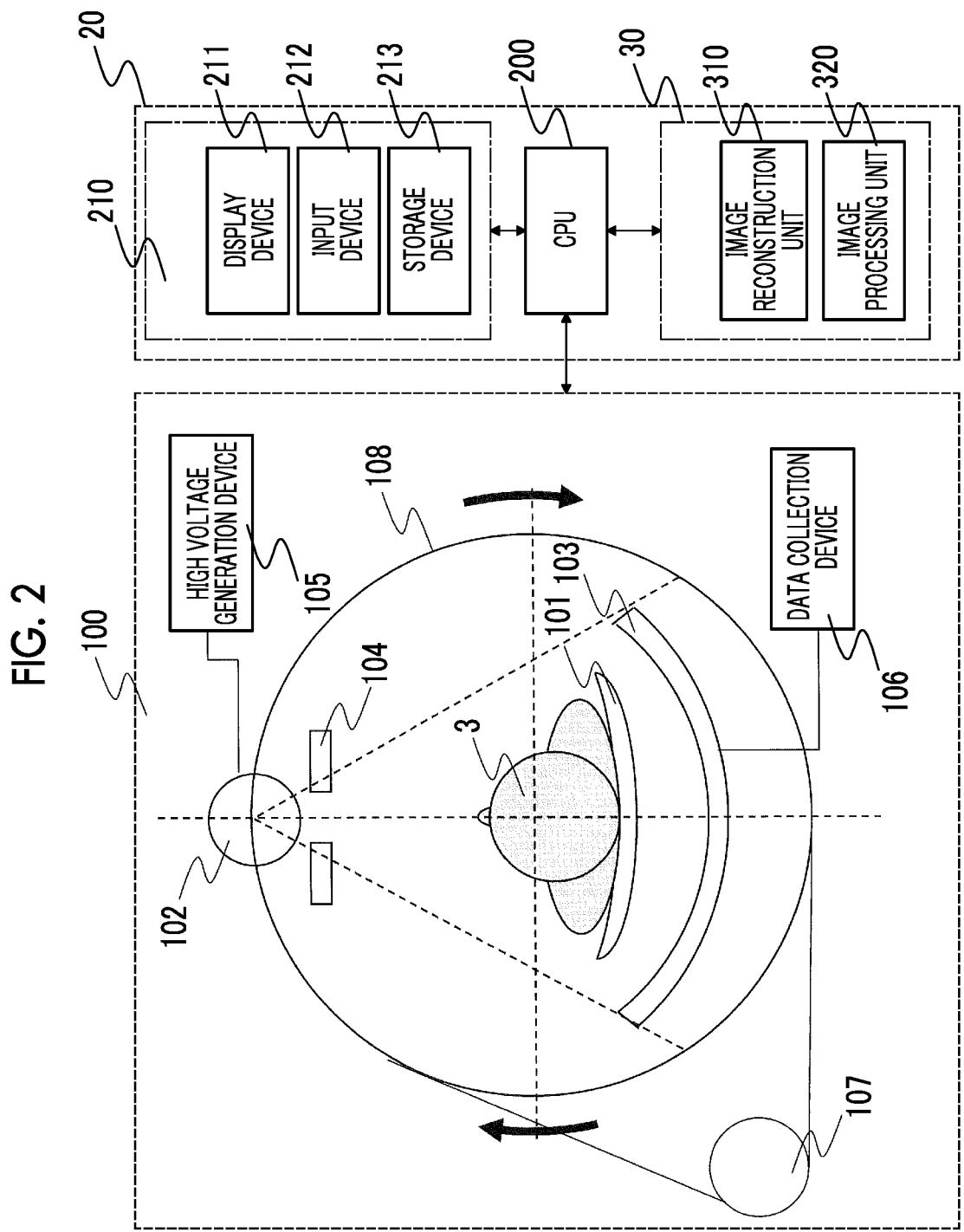
FIG. 2 is a block diagram of the X-ray CT apparatus to which the present invention is applied.

As shown in FIG. 2, the gantry 100 comprises an X-ray generation device 102 that generates X-rays with which a subject 3 is irradiated, a collimator device 104 that narrows a flux of the X-rays generated from the X-ray generation device 102, an X-ray detection device 103 that detects the X-rays transmitted through the subject, a scanner 108 on which the X-ray generation device 102, the collimator device 104, and the X-ray detection device 103 are mounted, a high voltage generation device 105 that applies a high voltage to the X-ray generation device 102, a data collection device 106 that collects transmitted X-ray data obtained from the X-ray detection device 103, and a drive device 107 that rotates the scanner 108 around the subject 3. The X-ray generation device 102 comprises an X-ray tube (not shown), and the subject 3 is irradiated with a predetermined amount of the X-rays by a predetermined tube current flowing through the X-ray tube.

The operation unit 20 comprises a central control device 200 that controls each device built in the gantry, and an input/output device 210 that functions as a user interface for performing communication between a user and the central control device 200, a computing unit 30 that performs various types of computing, such as image reconstruction, with respect to the transmitted X-ray data collected by the data collection device 106 is mounted in the central control device 200. However, a computing device different from the central control device 200 may be provided, and the computing device may function as the computing unit 30. The function of the central control device 200 is realized by the central control device 200 reading and executing a program that describes a computing algorithm or a processing procedure for control, but a part of the computing or the processing performed by the computing unit 30 can also be performed by using a programmable logic device (PLD), such as an ASIC or an FPGA.

The input/output device 210 includes an input device 212 that allows an operator to input imaging conditions and the like, a display device 211 that displays data, such as a captured image, or a GUI, and a storage device 213 that stores data necessary for imaging, such as a program or a device parameter.

The computing unit 30 includes an image reconstruction unit 310 that performs back-projection processing with respect to the transmitted X-ray data obtained by the data collection device 106 to create the tomographic image, and an image processing unit 320 that analyzes the image data, corrects the image, and the like. The correction of the image includes movement correction image reconstruction. The details will be described below.

The central control device 200 controls, in response to an operation instruction from the operator via the input device 212, the imaging unit 10 (X-ray generation device 102, X-ray detection device 103, high voltage generation device 105, collimator device 104, bed device 101, drive device 107, data collection device 106), the input/output device 210, and the computing unit 30. Each of these units operates under the control of the central control device 200 to reconstruct a CT image, correct a reconstructed CT image, and the like.

An outline of the operation of the X-ray CT apparatus performed under the control of the central control device 200 will be described with reference to the flow of FIG. 3.

Step S1

The subject 3 is placed on the bed device 101, and positioning imaging is performed. The positioning imaging is imaging for setting an imaging range of the subject 3, and acquires a transmitted X-ray image along a body axis direction while changing a relative position between the scanner 108 and the bed device 101 (subject 3). An examiner sets the imaging range by using this transmitted X-ray image. Then, the imaging unit 10 performs tomographic imaging accompanied by rotation of the scanner 108 with respect to the imaging range set based on the positioning image, and collects transmitted X-ray data of the subject.

Step S2

Image reconstruction conditions are set for the transmitted X-ray data of the subject acquired in the imaging step S1. The image reconstruction conditions are, for example, a thickness of the image (thickness of cross section), an FOV, and a condition of a filter, and further includes setting of a reconstruction heart phase (targeted reconstruction heart phase: which heart phase image is to be reconstructed) or the like in a case of electrocardiographic gated imaging. In the electrocardiographic gated imaging, a targeted reconstructed image position is determined by setting the targeted reconstruction heart phase. In addition, in a case in which it is known that the imaging includes a high absorption body, such as a case in which the high absorption body, such as a pacemaker (metal), is embedded in the subject 3 or a case in which imaging is performed by injecting a contrast agent having a high CT value, as the image reconstruction conditions, the image reconstruction conditions corresponding to the high CT value, such as widening a range width, are set. The computing unit 30 receives these image reconstruction conditions set by the user via the input device 212.

Step S3

The computing unit 30 performs the image reconstruction by using the transmitted X-ray data of the subject acquired in imaging step S1 based on the image reconstruction conditions set in reconstruction condition setting step S2. In this case, movement information of the subject during the imaging is acquired, the movement is corrected, and the reconstruction is performed (movement correction image reconstruction).

As shown in FIG. 4, step S3 of the movement correction image reconstruction includes step (image pair generation step) S31 of generating a pair of images (first image and second image) used for movement detection from the transmitted X-ray data collected in imaging step S1, step (pixel value adjustment step) S32 of adjusting pixel values of the generated image pair, step (movement information acquisition step) S33 of performing non-rigid body registration for the first image and the second image subjected to the adjustment in step S32 to acquire a movement vector between two images, and step (reconstruction step) S34 of reconstructing the image by using the transmitted X-ray data collected in imaging step S1 and the movement vector acquired in step S33.

Pixel value adjustment step S32 includes processing of first determining the presence or absence of the high absorption substance of the X-rays (hereinafter, referred to as high absorption body) for the generated image pair after the image pair is generated, and setting a predetermined limit value for the pixel values of the image pair in a case in which it is determined that the high absorption body is included, and thus the influence of the high absorption body is reduced in subsequent calculation of the movement vector. Details of these pieces of processing will be described in the later embodiment.

Step S4

Lastly, the movement correction image data created in reconstruction step S3 is displayed on the display device 211.

The CT image in which the movement is corrected by steps S1 to S4 is obtained and is presented to the examiner. In the X-ray CT apparatus of the present embodiment, the movement vector is calculated from the image pair, and in a case of performing the movement correction image reconstruction, the presence or absence of the high absorption body is first determined for the generated image pair, and a predetermined limit value is set for the pixel values of the image pair in a case in which it is determined that the high absorption body is included. As a result, in subsequent movement information acquisition step S33, it is possible to reduce the phenomenon that the correction result is distorted due to the promotion of the distortion (artifact) of a part of the subject due to the high absorption body. Therefore, it is possible to obtain an image in which the distortion due to the subject including the high absorption body and the excessive movement correction due to the distortion are reduced.

Hereinafter, specific embodiments of the movement correction image reconstruction processing will be described. In the following embodiments, the configurations and the processing flows common to the respective embodiments will be described with reference to FIGS. 2 to 4.

Embodiment 1

In the present embodiment, the presence or absence of the high absorption body is determined based on the pixels in the image pair, and in a case in which it is determined that the high absorption body is present, the pixel values that are used in the image pair used for the movement correction are limited by a threshold value.

Figure 5:
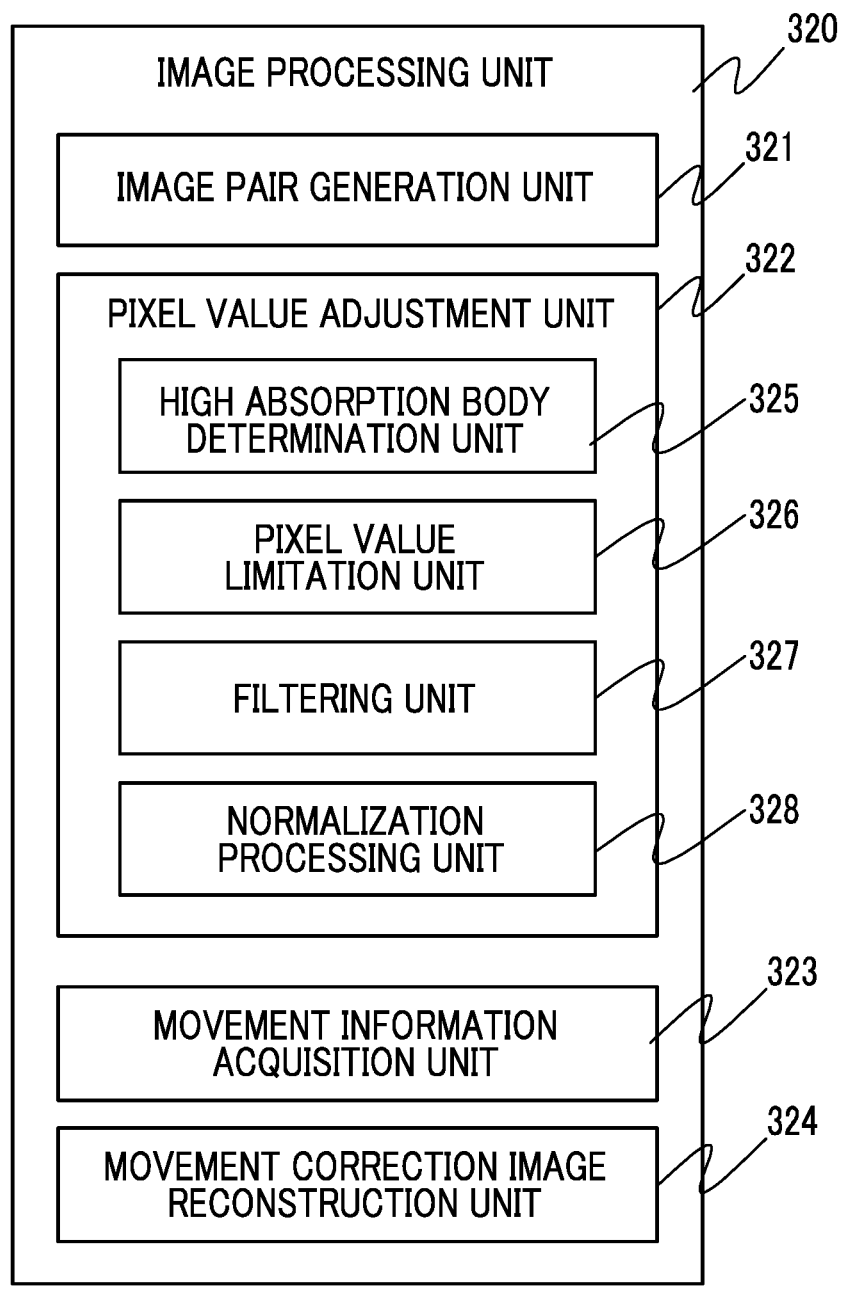
FIG. 5 is a functional block diagram of an image processing unit according to Embodiment 1.
Figure 7:
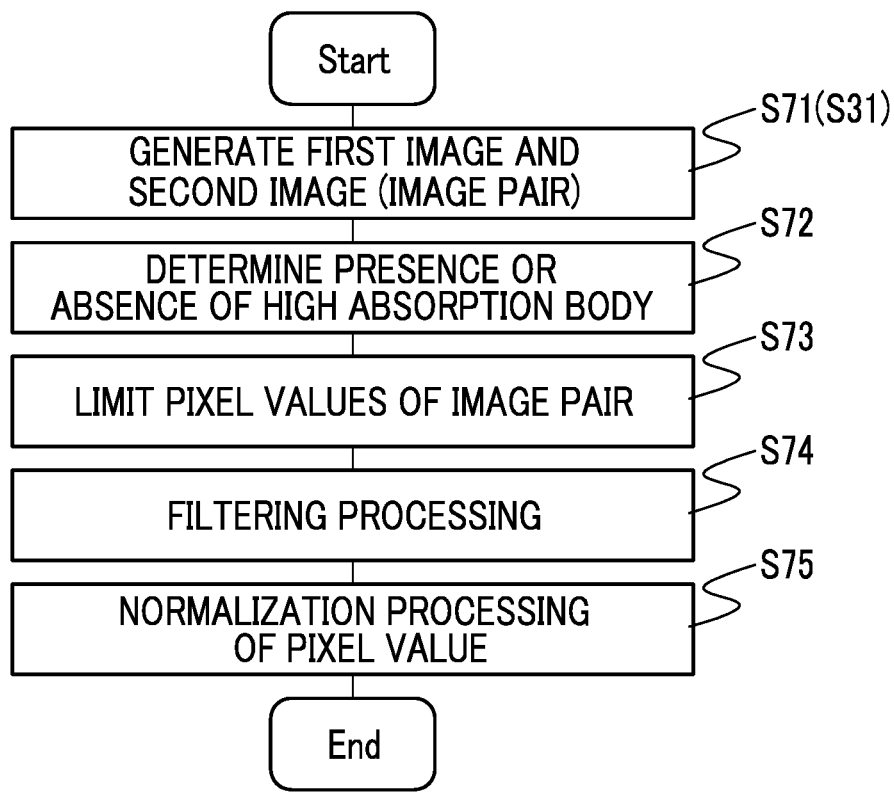
FIG. 7 is a flowchart showing an example of processing according to Embodiment 1.

FIG. 5 shows a configuration example of the image processing unit 320 according to the present embodiment. The image processing unit 320 includes an image pair generation unit 321 that generates a pair of images for acquiring the movement information used for the movement correction image reconstruction from the projection data, a pixel value adjustment unit 322 that determines the presence or absence of the high absorption body of the image pair generated by the image pair generation unit 321 to adjust the pixel values, a movement information acquisition unit 323 that calculates the movement vector by using the image pair subjected to the adjustment, and a movement correction image reconstruction unit 324. Further, the pixel value adjustment unit 322 includes a high absorption body determination unit 325 that determines whether or not a high CT value body is included in the image pair, a pixel value limitation unit 326 that sets the limitation to the pixel values of the image pair based on the result of the high absorption body determination unit 325, a filtering unit 327 that performs noise reduction processing, and a normalization processing unit 328 that performs normalization of the image pair. As shown in the example of FIG. 7, pixel value adjustment processing includes processing S72 of determining the presence or absence of the high absorption body, processing S73 of limiting the pixel values of the image pair, filtering processing S74, and normalization processing S75 of the pixel value.

Hereinafter, the movement correction image reconstruction processing according to the present embodiment will be described.

First, the contents of steps S31 to S33 will be described with reference to FIG. 4.

S31

In image pair generation step S31, two images, a first image and a second image, are generated from the transmitted X-ray data acquired at angle positions facing each other in time, for a targeted image reconstruction center position 500.

Figure 6:
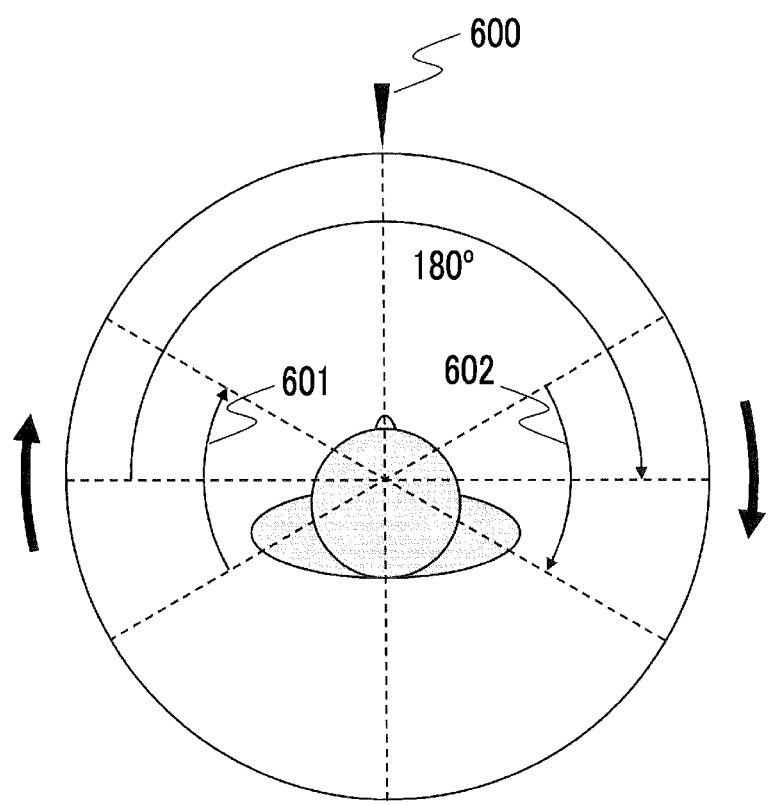
FIG. 6 is a diagram showing an image pair for acquiring movement information.

FIG. 6 shows a relationship between the targeted reconstructed image position, and the first image and the second image. In FIG. 6, a position 600 indicates a targeted image reconstruction center position set in reconstruction condition setting step S2, and in this example, a position at which the X-ray tube and the subject 3 face each other (position at which a rotation angle of the scanner is 0°) is the targeted image reconstruction center position. For the reconstruction of a tomographic image, the transmitted X-ray data in a predetermined angle range with this position 600 (0°) as a center, for example, a range equal to or more than 180° is used. However, the image pair is generated by using the transmitted X-ray data in which ranges 601 and 602 with the positions of −90° and +90° as a center, respectively, are the image reconstruction ranges. That is, the sizes of the image reconstruction ranges 601 and 602 are equal, the image reconstruction ranges 601 and 602 are in an angle range of less than 180°, and the image reconstruction center positions thereof are separated from each other by 180°. A value determined by default may be set for this angle range, or user's setting/change may be received in reconstruction condition setting step S2.

It should be noted that each of the first image and the second image is not limited to one two-dimensional image, and is a three-dimensional image composed of a plurality of two-dimensional images.

S32

The pixel value adjustment processing includes roughly three types of processing. Three types of processing are the processing of limiting the pixel values in the presence of the high absorption body, the noise reduction processing, and the normalization processing. The processing included in step S32 will be described with reference to the flow of FIG. 7.

S71

This step is the same as S31 in FIG. 4, and the image pair (first image and second image) is generated from the transmitted X-ray data. In a case in which the image reconstruction range including a plurality of slices is set along the body axis of the subject, the image pair is generated for each of the plurality of slices included in the image reconstruction range. The image pairs of the plurality of slices are collectively called an image pair group.

S72

The high absorption body determination unit 325 determines whether or not the high absorption body (for example, metal) is present in the image based on the pixel values of the image pair. In the determination method, for example, a ratio of the number of pixels of pixels having the CT value equal to or more than a certain value present in the image pair to the total number of pixels of the image pair is calculated as a content of the high absorption body. In a case in which the ratio is more than a predetermined value, it is determined that the high ab sorption body is present.

For example, in a case in which a determination threshold value (certain value described above) of the CT value is set to about 1100, it is regarded that the high absorption body is not included in a case in which the ratio of the number of pixels is less than 0.01%, and the high absorption body is included in a case in which the ratio of the number of pixels is equal to or more than 0.1%. A determination criterion can be set between the content of 0.01% and 0.1% to determine the presence or absence of the CT value of the high absorption body.

This determination may be performed for each image pair in a case in which there are the image pairs for the plurality of slices. However, in the present embodiment, a case in which the determination is performed with the entire image pair as a target will be described.

It should be noted that, in a case in which it is expected that the high absorption body is present from the set image reconstruction conditions (FIG. 2: S2), it may be determined that the high absorption body is included, without performing the calculation using the pixel value. In this case, the computing amount of the high absorption body determination unit 325 can be reduced.

S73

In a case in which it is determined in S72 that the high absorption body is present, the pixel value limitation unit 326 limits the pixel values for the image pair group obtained in S71. In a case in which it is not determined that the high absorption body is present, the following limitation of the pixel values is not performed. Specifically, the following upper limit value is set for the limitation of the pixel values. The upper limit value can be calculated by Expression (1) by setting a coefficient in a case in which the high absorption body is included and using this coefficient.

$$\text{Upper limit value} = \mu_{all} + \alpha_{all} \times \sigma_{all} \quad (1)$$

$\alpha_{all}$: Coefficient based on content of high absorption body
$\mu_{all}$: Average value of pixel values of all image pairs
$\sigma_{all}$: Standard deviation of pixel values of all image pairs (the same applies hereinafter).

For example, in a case in which the coefficient $\alpha_{all}$=2, a value obtained by adding 2G to the average value of the pixel values is the upper limit value. In this case, since the values of the average value and the standard deviation of the pixel values of the image pair are larger as the content of the high absorption body is higher, a value of the upper limit value is also increased, but it is possible to limit the pixel values by setting the coefficient to a relatively small value.

In addition, the coefficient $\alpha_{all}$ to be multiplied by the standard deviation of the pixel values may be changed according to the content of the high absorption body, instead of being invariable. For example, the coefficient $\alpha_{all}$ may be defined by a coefficient (certain value a) in a case in which the high absorption body is not included and a coefficient (Gall) changed according to the content of the high absorption body. In this case, the upper limit value is calculated by using, for example, Expression (2).

$$\text{Upper limit value} = \mu_{all} + (\alpha - \beta_{all} \ast 10) \times \sigma_{all} \quad (2)$$

Figure 8:
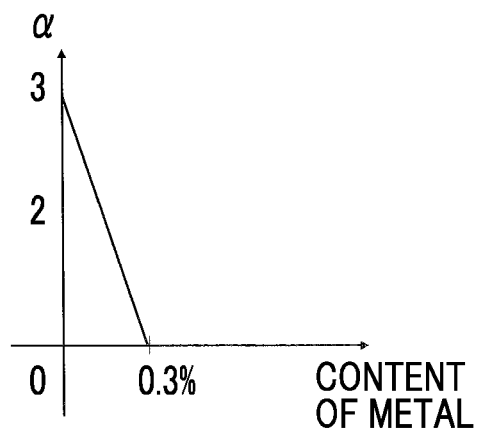
FIG. 8 is a diagram showing a relationship between a limitation of a pixel value and a density of a high absorption body.

The coefficient ($\beta_{all}$) is defined by a predetermined function changed according to the content of the high absorption body and is determined to be a value corresponding to the content, for example, the coefficient al is proportional to the content until the content reaches a predetermined content and is set to a certain value in a case in which the content is equal to or more than a certain content. FIG. 8 is a diagram showing a change in the coefficient $\alpha_{all}$ (=$\alpha - \beta_{all} \ast 10$) in a case in which the coefficient $\alpha$ in a case in which the high absorption body is not included is set to 3. In this example, in a case in which the high absorption body is not included (content=0), a value obtained by adding 3G to the average value of the pixel values is the upper limit value, the upper limit value is decreased as the content is increased, and the average value of the pixel values is the upper limit value in a case in which the content is equal to or more than 0.3%.

However, in a case in which the calculated upper limit value of the image pair exceeds the determination threshold value of the high absorption body, the upper limit value of the image pair is set to the determination threshold value.

In this way, by changing the coefficient according to the density of the high absorption body, it is possible to accurately eliminate the influence of the high absorption body without degrading the accuracy of the movement correction.

After the upper limit value is determined in this way, the value of the pixel whose pixel value exceeds the upper limit is substituted with the upper limit value. Then, the adjustment of the pixel values of the image pair is completed.

It should be noted that, although a case in which the value of the pixel whose pixel value exceeds the upper limit is substituted with the upper limit value has been described here, there is also a case in which the high absorption body (metal) or the like generates an extremely low pixel as a dark band in the image pair in addition to a high pixel, a lower limit value may be set in addition to the upper limit value, and the pixel value may be substituted with the lower limit value for the pixel less than the lower limit value. It should be noted that, as the lower limit value, for example, "−1000" can be set.

S74

The filtering unit 327 performs filtering with respect to the image pair whose pixel values are adjusted in S73, and acquires the image pair subjected to the filtering. The filtering is processing of reducing noise in the image pair, and one or more of a known low-pass filter, high-pass filter, Gaussian filter, or bilateral filter can be used. In addition, the filtering may be performed to adaptively change the smoothness, in consideration of a degree of noise.

S75

The normalization processing unit 328 performs the normalization processing of the pixel values on the image pair subjected to the filtering. The Min-Max method is used for the normalization, and the normalization is performed in a range of the minimum value of 0 to the maximum value of 1 for all the pixels of the image pair.

The pixel value adjustment processing (S32) is completed in S72 to S75.

S33

After the pixel value adjustment is performed for the image pair, the movement information acquisition unit 323 detects the movement information. This processing is the same as the movement detection technique in the related art, in which the non-rigid body registration of the two images is performed and the movement vector between the images is calculated.

S34

The movement correction image reconstruction unit 324 performs the movement correction image reconstruction using the movement vector calculated in step S33 and the transmitted X-ray data collected in the imaging step (FIG. 3: S1). In the movement correction image reconstruction, the magnitude or the direction of the movement of the subject in a case of acquiring each transmitted X-ray data used for the image reconstruction is estimated from the movement vector calculated from the first image and the second image created at positions separated by 180° with the targeted image reconstruction position as a center, the image at the targeted image reconstruction position is corrected based on this information, and the back-projection is performed, so that the tomographic image can be reconstructed.

Thereafter, displaying the reconstructed image (FIG. 4: S4) is the same as displaying in the common embodiment.

According to the present embodiment, by setting the upper limit for the pixel values of the image pair even in a case in which the subject includes the high absorption body, such as metal, the influence of the high absorption body can be reduced in a case in which the movement vector is calculated from the difference between the image pairs, the occurrence of the distortion due to the high absorption body in the image after the movement correction image reconstruction using the movement vector can be prevented, and the accuracy of the movement correction can be increased.

Embodiment 2

In Embodiment 1, a case in which it is determined whether or not the high absorption body is included with the image reconstruction range as a target to adjust the entire pixel value has been described. However, in the present embodiment, it is determined whether or not the high absorption body is included, for each of the plurality of slices included in the image reconstruction range, the image pair used for the pixel value adjustment is selected based on the result of the determination, and the pixel value adjustment is performed. The present embodiment is, for example, suitably adapted to a case in which the high absorption body whose region is elongated in the body axis direction, such as a lead wire of a pacemaker, is included.

Figure 9:
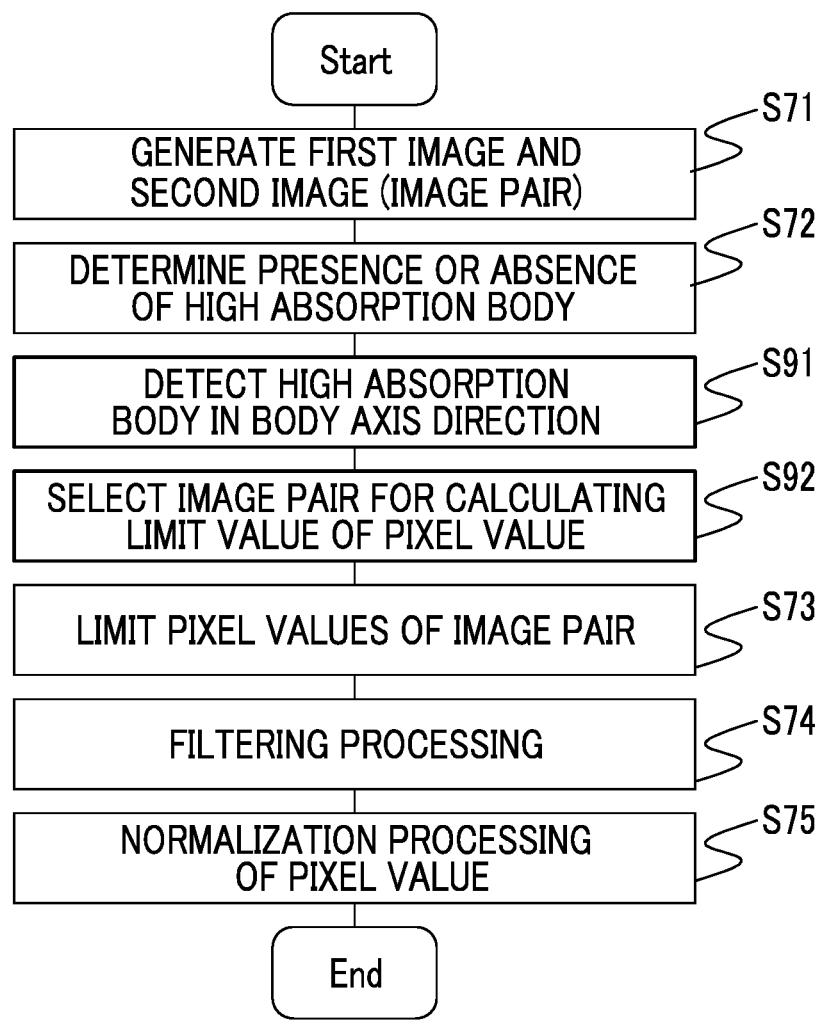
FIG. 9 is a flowchart showing an example of processing according to Embodiment 2.

In the present embodiment as well, the configuration of the image processing unit 320 is the same as the configuration in Embodiment 1, but in the present embodiment, the processing of the pixel value adjustment unit 322 related to the determination of the high absorption body and the pixel value limitation accompanying the determination is different. FIG. 9 shows a flow of processing of the pixel value adjustment unit 322 according to the present embodiment. In this flow, the same steps as the steps shown in FIG. 7 are indicated by the same reference numerals, and redundant description will be omitted. As shown in FIG. 9, in the present embodiment, after determining the presence or absence of the high absorption body, the high absorption body in the body axis direction is detected (S91), processing (S92) of selecting the image pair used for calculating the limit value of the pixel value using the result of the detection is added, and the pixel value limitation unit 326 calculates the upper limit value of the pixel value by using the selected image pair.

Hereinafter, the processing of FIG. 9 will be described with a focus on the difference from Embodiment 1.

S71, S72

Figure 10:
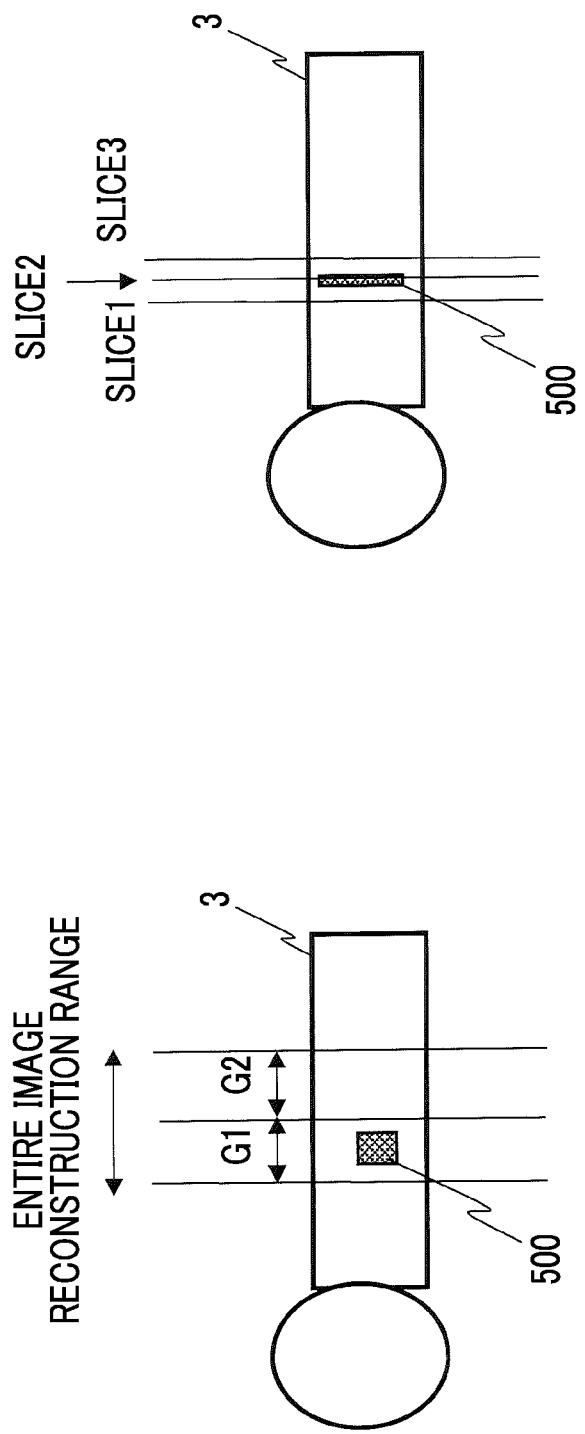
FIGS. 10A and 10B are diagrams showing a relationship between an imaging position of a subject and the high absorption body, respectively.

In the present embodiment, as schematically shown in FIG. 10A, the imaging unit 10 performs imaging in a predetermined range along the body axis direction of the subject 3, and acquires the X-ray projection data at a plurality of imaging positions (slices) orthogonal to the body axis direction. The range from which the X-ray projection data used for the image reconstruction is obtained is set to an entire image reconstruction range.

In step S71, the image pair generation unit 321 generates one image pair for each slice. Next, in step S72, the high absorption body determination unit 325 determines the presence or absence of the high absorption body for each slice. As in Embodiment 1, in the determination method, it is determined that the high absorption body is present in a case in which the pixel value of each image of the image pair is equal to or more than a predetermined certain value (determination threshold value).

S91

In a case in which the pixel value exceeds the determination threshold value in advance in a certain number or more of image pairs continuous in the body axis direction in the image pair group obtained in S71, it is determined that the image pair is an image pair in which the high absorption body is continuously present in the body axis direction.

S92

The image pair group used for calculating the limit value of the pixel value is selected from among the image pair groups in the entire image reconstruction range. For example, as shown in FIG. 10A, in a case in which the high absorption body is continuously present over the plurality of slices along the body axis direction of the subject 3, an image pair group G1 generated for the plurality of slices is excluded, and an image pair group G2 other than the image pair group G1 is selected.

S73

By using the average value and the standard deviation of the image pair group G2 selected in S92, the pixel value is limited for all the image pair groups generated in S72. That is, the upper limit value is calculated, and the pixel value equal to or more than the upper limit value is substituted with the upper limit value.

Specifically, the upper limit value is calculated by the following expression.

$$\text{Upper limit value} = \mu_{part} + \alpha_{part} \times \sigma_{part} \quad (3)$$

$\alpha_{part}$: Coefficient value based on subject that does not include high absorption body $\mu_{part}$: Average value of pixel values of image pair selected in S722

$\sigma_{part}$: Standard deviation of pixel values of image pair selected in S722

Here, the coefficient $\alpha_{part}$ to be multiplied by the standard deviation is a coefficient on the premise of the image that does not include the high absorption body, and is set to a value more than the coefficient ($\alpha_{all}$) set for the image that includes the high absorption body in Embodiment 1 ($\alpha_{part} > \alpha_{all}$). For example, $\alpha_{part} = 3$. As a result, it is possible to set the upper limit value based on the image pair that is not affected by the metal.

Thereafter, performing the filtering with respect to each image constituting the image pair by the filtering unit 327 (S73), performing the normalization by the normalization processing unit 328 (S74), acquiring the movement information by using the image pair subjected to these types of processing (FIG. 4: S33), performing the movement correction image reconstruction (FIG. 4: S34) are the same as in Embodiment 1.

According to the present embodiment, by selecting the image pair (group) that does not include the high absorption body, and limiting the pixel values of the image pair including the high absorption body based on the pixel values of the image pair, the influence of the high absorption body on the subsequent movement information acquisition processing can be further reliably reduced.

In Embodiment 1 and Embodiment 2, the pixel values of the image pair used for the movement correction is limited to reduce the influence of the high absorption body included in the image reconstruction range or each slice. However, hereinafter, an embodiment in which the movement vector is calculated by using the image pair created for the slice that does not include the high absorption body without adjusting the pixel values will be described. There are several aspects in which the image pair of the slice different from the slice that is the target of the movement correction is used, and an embodiment will be described below for each aspect.

Embodiment 3

In the present embodiment, the image pair is created by using the projection data of the adjacent slice (adjacent slice) determined to have a relatively low content of the high absorption body, and the movement vector of the slice that is the target of the movement correction image reconstruction is calculated from the image pair of the adjacent slice.

Embodiment 2 is an embodiment suitable for a case in which the high absorption body extends to a predetermined range within the image reconstruction range along the body axis direction, but the present embodiment can be suitably applied to a case in which the high absorption body, such as thin metal, extends in a direction orthogonal to the body axis in a relatively narrow range, as shown in FIG. 10B.

Figure 11:
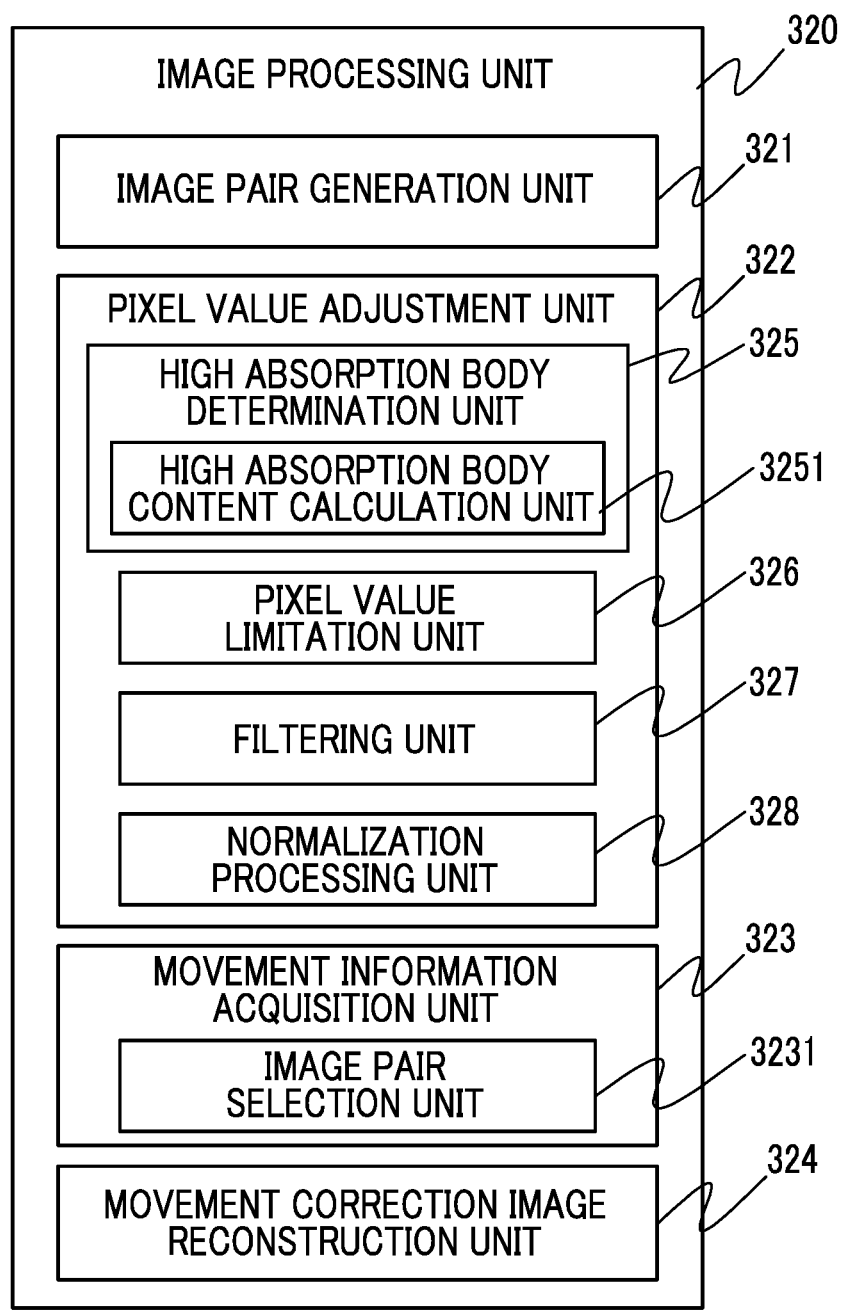
FIG. 11 is a functional block diagram of an image processing unit according to Embodiment 3.

FIG. 11 shows a configuration of the image processing unit 320 in the present embodiment. In FIG. 11, the element that performs the same processing as the element shown in FIG. 5 is indicated by the same reference numeral. In Embodiment 1 and Embodiment 2, although the pixel value of the image pair is limited by using the result of the determination of the presence or absence of the high absorption body, in the present embodiment, the movement information acquisition processing is performed by using the result of the determination of the high absorption body. Therefore, as shown in FIG. 11, a high absorption body content calculation unit 3251 that calculates the content of the high absorption body and an image pair selection unit 3231 that selects the image pair used for the processing of the movement information acquisition unit 323 are added. It should be noted that, in FIG. 11, for convenience, the high absorption body content calculation unit 3251 is positioned as a functional unit attached to the high absorption body determination unit 325, and the image pair selection unit 3231 is positioned as a functional unit attached to the movement information acquisition unit 323, but the added functional unit may be regarded as being independent of the belonging functional unit.

Figure 12:
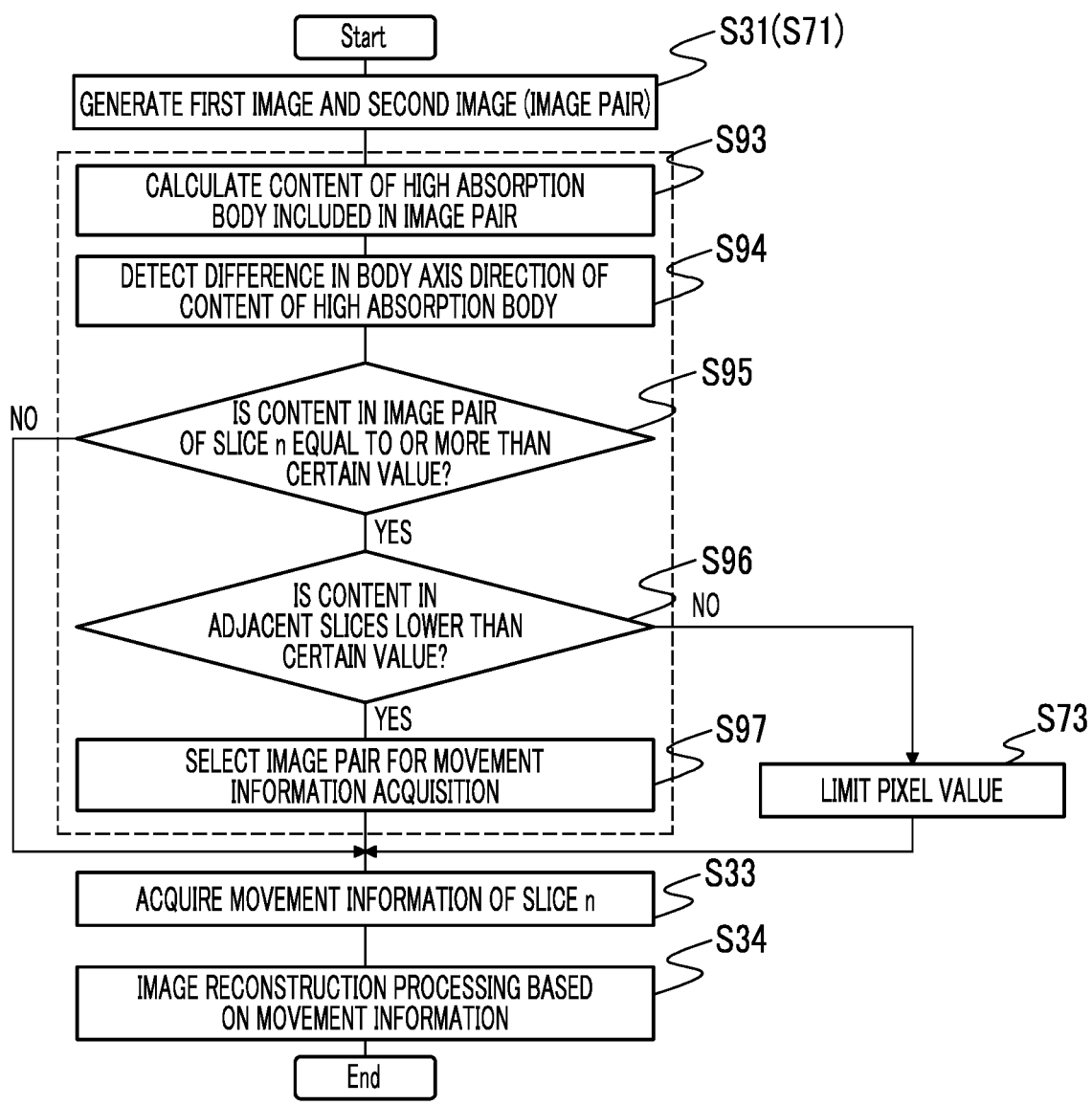
FIG. 12 is a flowchart showing an example of processing according to Embodiment 3.

Hereinafter, processing of the image processing unit 320 in the present embodiment will be described with reference to FIG. 12. In the flow of FIG. 12, the same steps as the steps shown in FIG. 4 are indicated by the same reference numerals, and redundant description will be omitted. As shown by a dotted frame in FIG. 12, in the present embodiment, as processing corresponding to the processing of determining the presence or absence of the high absorption body (FIG. 7: S72), the content of the high absorption body included in each image pair is calculated by the high absorption body content calculation unit 3251 (S93), and then a difference in the content of the high absorption body in the body axis direction is detected (S94). By using the result of the detection, the image pair selection unit 3231 selects the image pair used for calculating the movement information for a predetermined imaging position (slice) in the movement information acquisition unit 323 (S97), and acquires the movement information of the slice by using the selected image pair.

Hereinafter, the processing of FIG. 12 will be described with a focus on the difference from Embodiment 1.

S31

As shown in FIG. 10B, the image pair is generated from each of the projection data of a slice 2 including the high absorption body and the projection data of the plurality of slices including the slice 2.

S93

The content of the high absorption body is calculated for the image pair generated for each of the plurality of slices. The calculation of the content of the metal is the same as in a case of determining the presence or absence of the high absorption body in Embodiment 1, and a value obtained by dividing the number of pixels of the pixel value equal to or more than a certain value, which is present in the image pair, by the number of pixels of the image pair is set to the content of the metal. A certain value is the determination threshold value for determining the high absorption body, and is set to a predetermined value in advance.

S94 to S97

For the image pair in which the content of the high absorption body is high at a certain degree, the comparison with the content of the high absorption body in the image pairs of the adjacent slices on both sides in the body axis direction (S94). As a result, in the slice (slice n in the drawing) that is the target of the movement correction image reconstruction, in a case in which the content of the high absorption body of the image pair is equal to or more than a certain value (for example, determination threshold value) (S95) and the content of the high absorption body of the image pair of the slice adjacent thereto (for example, slice n−1 and slice n+1) is less than a certain value (S96), the image pair of the slice n is not used for the movement correction, and the image pair of the slice is selected (S97).

It should be noted that, in step S95, in a case in which it is determined that the content of the high absorption body of the image pair of the slice n is less than a certain value, the image adjustment, such as filtering or normalization (not shown), is performed with respect to the image pair, and then the movement vector is calculated.

Further, in step S96, in a case in which the content of the high absorption body of the adjacent slice is equal to or more than a certain value, for the slice n (and adjacent slice), the pixel value of the image pair is limit as in Embodiment 1 (FIG. 7: S72). That is, the sum of the average value of the pixel values of the image pair and a value obtained by multiplying the standard deviation by a predetermined coefficient is set as the upper limit value of the pixel value, and the pixel value equal to or more than the upper limit value is substituted with the upper limit value.

S33

In a case in which the image pair whose pixel value is adjusted is used without selecting an image pair for movement information acquisition in step S97, as in the embodiment, the movement vector is calculated by non-rigid body registration of two images constituting the image pair.

On the other hand, in a case in which it is determined in steps S95 to S97 that the image pair of the slice n is not used, the movement vector of the slice n is calculated by using the image pair of the slice adjacent to the slice n. For example, in a case in which both the slice n−1 and the slice n+1 on both sides of the slice n have the content of the high absorption body less than a certain value, the movement vector obtained by averaging both movement vectors according to Expression (4) is set to the movement vector of the slice n.

Movement correction vector $v_z = v_{z-1} + v_{z+1}$ (4)

$v_z$: Three-dimensional movement vector at imaging position z at which high absorption body is present in direction orthogonal to body axis $v_{z-1}$, $v_{z+1}$: Vectors at imaging positions adjacent to imaging position z in body axis direction It should be noted that, although a case in which the content of the high absorption body of the slices on both sides is low and the image pairs of the slices on both sides are used has been described here, it is also possible to use only one image pair. Alternatively, in step S96, the image pairs of the slices on both sides may be selected with the content of the high absorption body being low as the upper limit.

Further, in Expression (4), a case in which the vectors of the slices on both sides are simply averaged has been described, but it is also possible to take a weighted average with weights in consideration of the content of the high absorption body with respect to the slices on both sides. The weight of the weighted addition is determined such that the weight of the slice not including the high absorption body is more than the weight of the slice having a high content of the high absorption body. For example, the weight is set to 1 in a case in which the content of the metal of one slice is 0, and the weight is set to 0.5 or the like in a case in which the content of the metal of the other slice is 0.1%.

In a case of performing the weighted arithmetic mean, the movement vector calculated from the image pair generated from the target slice may also be added to the weighted arithmetic mean.

S34

As described above, for the slice from which the image pair not used for the movement correction is obtained, the movement vectors of the image pairs obtained from the adjacent slices on both sides are averaged and used for the image reconstruction processing based on the movement information to perform the movement correction image reconstruction.

According to the present embodiment, in a case in which the high absorption body, such as thin metal, orthogonal to the body axis direction is present, it is possible to perform the movement correction that eliminates the influence of the high absorption body by performing the movement correction by using the movement vector obtained from the image pair obtained from the imaging positions adjacent to each other in the body axis direction with respect to the presence position of the high absorption body.

Embodiment 4

In Embodiment 3, in a case in which the high absorption body is present in the slice n that is the target of the movement correction image reconstruction, in a case in which the movement vector of the slice n is calculated by using the image pair generated from the adjacent slice (slice n−1 and/or slice n+1) as an image pair for movement correction, the three-dimensional movement vectors obtained for each image pair for movement correction are averaged or weighted and averaged to obtain a vector for correction. However, in the present embodiment, the image pair of the slice n that is the target of the movement correction image reconstruction is substituted with the adjacent image pair and used for the correction.

Since other configurations are the same as configurations of the embodiment, the difference will be described with reference to FIG. 12 used in Embodiment 3.

In the present embodiment, in a case in which the content of the high absorption body is high in the slice n that is the target of the movement correction image reconstruction, in step S97 of FIG. 12, the image pair to be substituted with the image pair of the slice n is selected as the image pair for movement information acquisition. The image pair is the image pair of the slices which are both or one of the adjacent slices (slice n−1 and slice n+1) and in which the content of the high absorption body is low. The selected image pair is substituted with the image pair of the slice n in a case in which one image pair is selected, the plurality of image pairs are averaged to be one image pair and substituted with the image pair of the slice n in a case in which a plurality of image pairs are selected, the non-rigid body registration of two images constituting the image pair is performed, and then the movement correction is performed by using the vector obtained by the non-rigid body registration as the correction vector for the target slice n.

According to the present embodiment, the movement correction vector can be calculated based on the image pair excluding the high absorption body in a case in which the high absorption body is included, the occurrence of the distortion due to the high absorption body in the image after the movement correction image reconstruction can be suppressed, and the image having a good image quality can be obtained by reducing the movement artifact.

Modification Example 1 of Embodiment 4

In Embodiment 4, a case in which the image pair of the slice having a high content of the high absorption body is substituted with the image pair of the adjacent slice having a low content of the high absorption body has been described, but the image pair for acquiring the movement information may be generated by using the image pair of the slice having a high content of the high absorption body. That is, in the present modification example, for the plurality of slices including the slice n that is the correction target and the adjacent slices (slices n−1 and n+1), a weight coefficient corresponding to the content of the high absorption body is calculated, the arithmetic mean is performed with respect to the image pairs of the plurality of slices by using the weight coefficient, and the result thereof is used as the image pair for acquiring the movement information of the slice that is the correction target.

The method of calculating the weight coefficient is the same as the method of performing the weighted arithmetic mean of the movement vector in Embodiment 3. For example, the image pair of the slice n is multiplied by the weight coefficient calculated for the slice, the image pair of the adjacent slice (in a case in which there are two adjacent slices, the average thereof) is multiplied by (1−weight coefficient of slice n), and the result thereof is added. The image pair processed in this way is used as the image pair of the slice n.

Although a case in which the content of the high absorption body of the slices on both sides is low and the image pairs of the slices on both sides are used has been described here, it is also possible to use only one image pair. In this case, the result of adding the image pair on one side multiplied by (1−correction coefficient of the slice) and the image pair of the slice multiplied by the correction coefficient is set to the image pair of the slice.

As in Embodiment 4, the vector obtained by the non-rigid body registration after the image pair is substituted in this way is set to the correction vector for the corresponding slice position.

According to the present embodiment, in a case in which the high absorption body is included, the movement correction information of the slice can be reflected while suppressing the influence of the high absorption body by using the image pair at the positions including the high absorption body together with the content, the occurrence of the distortion due to the high absorption body in the image after the movement correction image reconstruction can be suppressed, and the image having a good image quality that reflects more realistic movement information can be obtained by reducing the movement artifact.

Modification Example 2 of Embodiment 4

The present modification example is the same as Modification Example 1 in that the image pair for acquiring the movement information is generated by using the image pair of the slice n that is the target of the movement correction and the image pair of the adjacent slice. However, although the image pair is generated by multiplication by the weight coefficient in Modification Example 1, in the present modification example, for the image pair of the slice n, the pixel whose pixel value exceeds the upper limit value or the lower limit value is substituted with the pixel of the adjacent slice, and then the image pair is generated.

As described in Embodiment 1 or Embodiment 2, the upper limit value or the lower limit value of the pixel can be determined by using the average value and the standard deviation of the pixel values of all the image pairs or the selected image pair.

Thereafter, an average of a plurality of image pairs is obtained, and is used as the image pair for acquiring the movement information of the slice n to perform the movement correction image reconstruction, as Embodiment 4.

According to the present embodiment, only information of the pixel affected by the high absorption body in the image pair of the slice can be excluded, and by calculating the movement correction vector in consideration of other information, the occurrence of the distortion due to the high absorption body in the image after the movement correction image reconstruction can be suppressed, and the image having a good image quality that reflects more realistic movement information can be obtained by reducing the movement artifact.

Embodiment 5

In the present embodiment, the weighting of the correction is changed in the body axis direction in consideration of the change in the content of the high absorption body in the body axis direction. The processing up to the acquisition of the movement information is the same as the processing of the image processing unit in Embodiments 1 to 3, but the present embodiment targets a case in which the three-dimensional movement vector is calculated as the movement information.

In general, a body movement, such as a heartbeat, occurs in the body axis direction in addition to an in-plane orthogonal to the body axis, as shown in FIG. 13A. For example, in a case in which imaging is performed while the imaging position is slightly moved in the body axis direction while collecting the projection data for one image as in spiral scanning, the position in the body axis direction is also changed while the two images constituting the image pair are acquired, and thus the three-dimensional movement is calculated as the three-dimensional movement vector by performing the non-rigid body registration of these two images. Therefore, in the movement correction image reconstruction using the three-dimensional movement vector, the pixel value is also corrected for the movement in the body axis direction. Here, the correction of the pixel value using a three-dimensional movement vector is effective in a case in which the high absorption body is not included or in a vicinity of a boundary between the slice in which the high absorption body is not included or the slice in which the high absorption body is included, but in the slice in which a relatively large amount of the high absorption bodies are included, the effect of reducing the artifact by the correction (particularly, the effect of reduction in the body axis direction) is likely to be impaired by the influence of the high absorption body.

Therefore, in the present embodiment, in the correction using such a three-dimensional movement vector, the correction coefficient is set for the movement in the body axis direction, and the correction coefficient is changed according to the content of the high absorption body along the body axis direction. The calculation of the content of the high absorption body is the same as the method described in Embodiment 1 or Embodiment 3, and the value obtained by dividing the number of pixels of the pixel value equal to or more than a certain value, which is present in the image pair, by the number of pixels of the image pair is set to the content of the metal.

For example, as shown in FIG. 13A, in a case in which the high absorption body, such as metal, is present over the plurality of imaging positions in the body axis direction, the content thereof is changed as shown in FIG. 13B. In the present embodiment, in a case in which the correction coefficient of the image pair that does not include the high absorption body is set to 1, the correction coefficient is determined such that the correction coefficient is decreased as the content of the high absorption body is increased. FIG. 13C shows an example of a relationship between the correction coefficient and the content of the high absorption body. In this example, the correction coefficient is set to 0 in a case in which the content of the high absorption body is equal to or more than 0.2%, and the correction coefficient is determined by the linear interpolation in a case of the content from 0% to 0.2%.

The movement correction image reconstruction unit 324 performs the movement correction image reconstruction by multiplying a vector value in the body axis direction by the correction coefficient in a case in which the pixel value is corrected by using the calculated three-dimensional movement vector.

According to the present embodiment, in a case in which the high absorption body is included in a relatively wide range or in a relatively high content, a degree of correction is made different depending on the content, so that the occurrence of the distortion due to the high absorption body in the image after the movement correction image reconstruction can be suppressed, and the image having a good image quality can be obtained by reducing the movement artifact.

EXPLANATION OF REFERENCES

1: X-ray CT apparatus
3: subject
10: imaging unit
30: computing unit
310: image reconstruction unit
320: image processing unit
321: image pair generation unit
322: pixel value adjustment unit
323: movement information acquisition unit
324: movement correction image reconstruction unit
325: high absorption body determination unit (determination unit)
326: pixel value limitation unit

What is claimed is:

1. An X-ray CT apparatus comprising:
an imaging unit that includes an X-ray source and an X-ray detector that are rotated around a subject, and acquires transmitted X-ray data of the subject for a predetermined angle range; and
a processor, configured to
generate a reconstructed image by using the transmitted X-ray data acquired by the imaging unit,
generate an image pair at facing positions by using a part of the transmitted X-ray data,
adjust the image pair generated by the image pair generation unit,
acquire movement information of the subject during scanning by using the adjusted image pair,
perform image reconstruction by correcting the transmitted X-ray data by using the movement information, and
determine whether or not a high absorption substance of X-rays is included in the subject,
wherein the image pair is adjusted based on a result of the determination of whether or not the high absorption substance of X-rays is included in the subject.

2. The X-ray CT apparatus according to claim 1,
wherein the processor determines whether or not the high absorption substance is included in the subject based on an image reconstruction condition for generating the reconstructed image.

3. The X-ray CT apparatus according to claim 1,
wherein the processor determines whether or not the high absorption substance is included in the subject based on a content of the high absorption substance calculated from pixel values of the image pair.

4. The X-ray CT apparatus according to claim 1,
wherein the processor adjusts pixel values of the image pair, and
wherien the processor sets an upper limit value for the pixel values of the image pair in a case in which it is determined that the high absorption substance is included in the subject.

5. The X-ray CT apparatus according to claim 4,
wherein the processor calculates the upper limit value by using an average value and a standard deviation of the pixel values of the image pair.

6. The X-ray CT apparatus according to claim 4,
wherein the processor calculates the upper limit value based on a content of the high absorption substance.

7. The X-ray CT apparatus according to claim 4,
wherein the processor calculates the upper limit value for an image pair at imaging positions, in an entire image reconstruction range, at which it is determined that the high absorption substance is included by using pixel values of an image pair at imaging positions at which it is determined that the high absorption substance is not included.

8. The X-ray CT apparatus according to claim 1,
wherein the processor selects an image pair at imaging positions, in an entire image reconstruction range, at which it is determined that the high absorption substance is not included, and
the processor acquires movement information at an imaging position at which it is determined that the high absorption substance is included by using movement information acquired from the selected image pair.

9. The X-ray CT apparatus according to claim 1, wherein the processor adjusts an image pair at imaging positions, in an entire image reconstruction range, at which it is determined that the high absorption substance is included by using an image pair at imaging positions at which it is determined that the high absorption substance is not included.

10. The X-ray CT apparatus according to claim 9, wherein the processor substitutes the image pair at the imaging positions, in the entire image reconstruction range, at which it is determined that the high absorption substance is not included with the image pair at the imaging positions at which it is determined that the high absorption substance is included.

11. The X-ray CT apparatus according to claim 9, wherein the processor generates an image pair for acquiring movement information at the imaging positions at which it is determined that the high absorption substance is included by using the image pair at the imaging positions at which it is determined that the high absorption substance is not included and the image pair at the imaging positions at which it is determined that the high absorption substance is included.

12. The X-ray CT apparatus according to claim 11, wherein the processor substitutes a pixel at a position having a high content of the high absorption substance in the image pair at the imaging positions at which it is determined that the high absorption substance is included with a pixel of the position of the image pair at the imaging positions at which it is determined that the high absorption substance is not included, to generate the image pair for acquiring the movement information.

13. The X-ray CT apparatus according to claim 1, wherein the processor changes a degree of correction in a body axis direction of the subject using the movement information according to a change in a content of the high absorption substance in the body axis direction.

14. A CT image reconstruction method of calculating a movement vector of a subject by using an image pair extracted from transmitted X-ray data acquired by using an X-ray CT apparatus and generated from the transmitted X-ray data at two facing angle positions, and performing image reconstruction in which movement of the subject is corrected by using the movement vector and the transmitted X-ray data, the method comprising:
  a step of determining whether or not a high absorption substance of X-rays is included in the image pair; and
  a step of adjusting pixel values of the image pair in a case in which it is determined that the high absorption substance is included in the image pair,
  wherein the movement vector is calculated by using the image pair whose pixel values are adjusted.

15. A CT image reconstruction method of calculating a movement vector of a subject by using an image pair extracted from transmitted X-ray data acquired by using an X-ray CT apparatus and generated from the transmitted X-ray data at two facing angle positions, and performing image reconstruction in which movement of the subject is corrected by using the movement vector and the transmitted X-ray data, the method comprising:
  a step of determining whether or not a high absorption substance of X-rays is included in the image pair, for an entire image reconstruction range,
  wherein the movement vector is calculated for an imaging position at which it is determined that the high absorption substance is included in the image pair in the entire image reconstruction range by using an image pair at imaging positions at which it is determined that the high absorption substance is not included in the image pair.

* * * * *